June 5, 1956 H. F. RAMSBERGER 2,748,890
LIQUID CONTROL DEVICE FOR FLUSH TYPE PRECIPITATORS
Filed Feb. 17, 1954 2 Sheets-Sheet 1
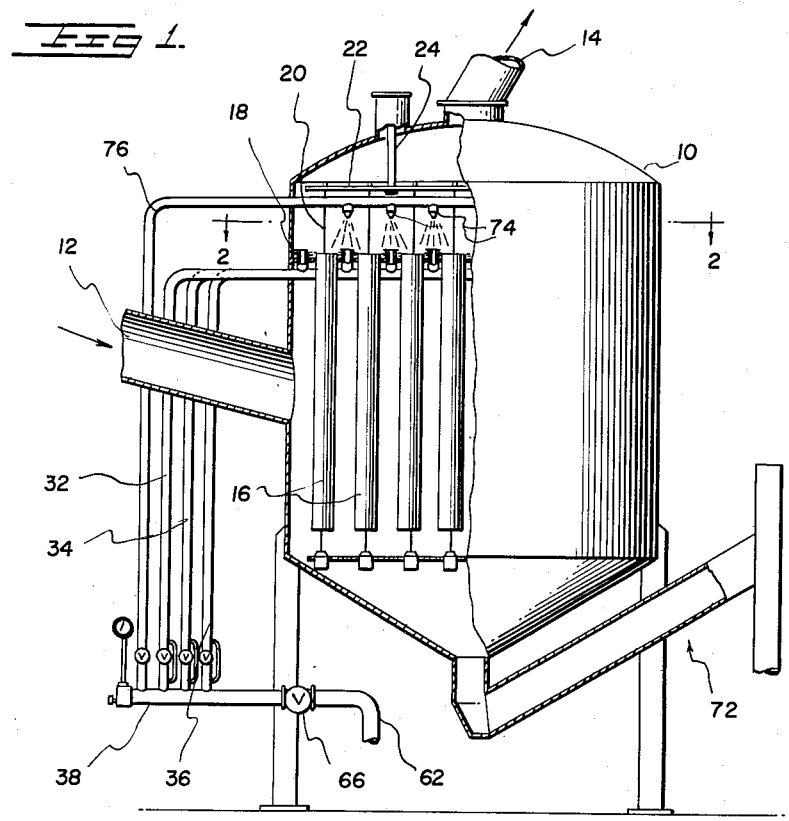
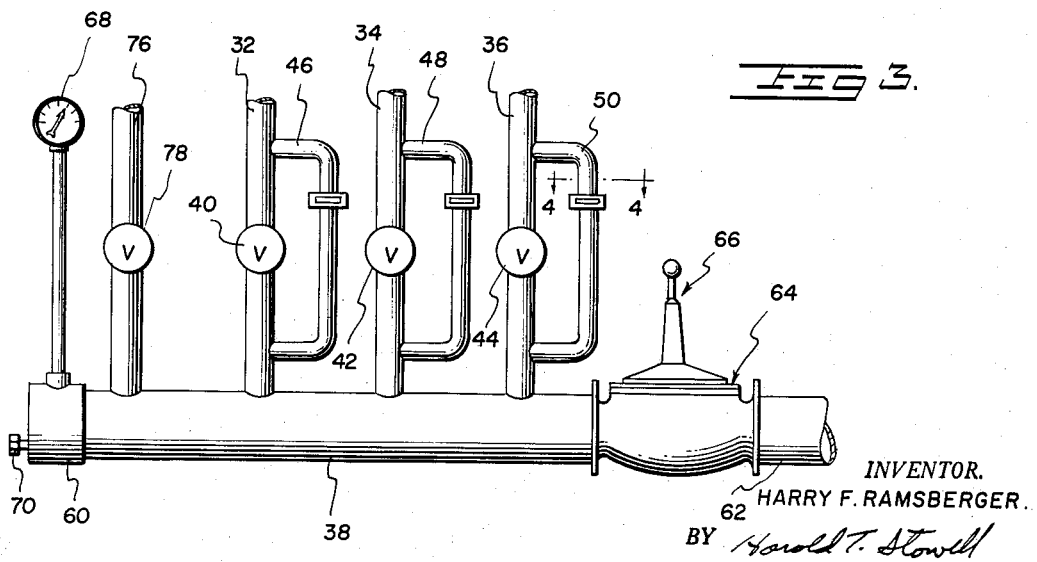
INVENTOR.
HARRY F. RAMSBERGER.
BY Harold T. Stowell
ATTORNEY.

June 5, 1956  H. F. RAMSBERGER  2,748,890
LIQUID CONTROL DEVICE FOR FLUSH TYPE PRECIPITATORS
Filed Feb. 17, 1954  2 Sheets-Sheet 2
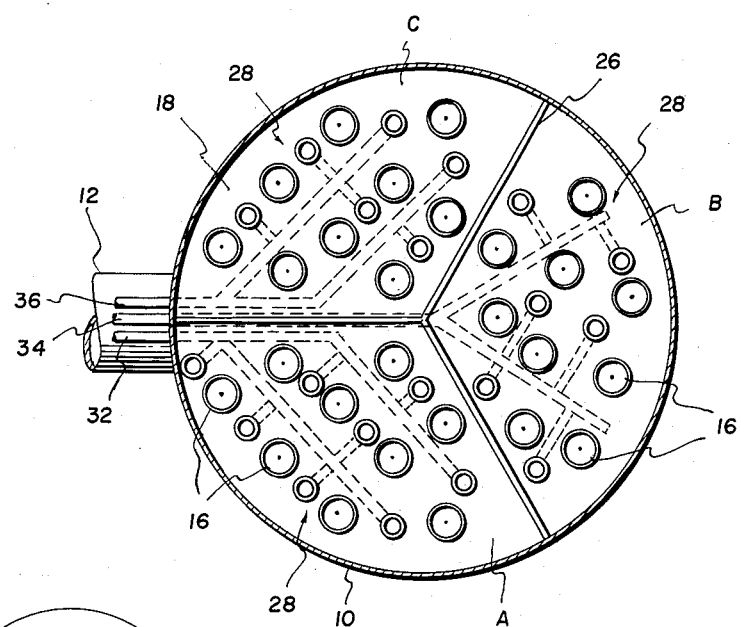
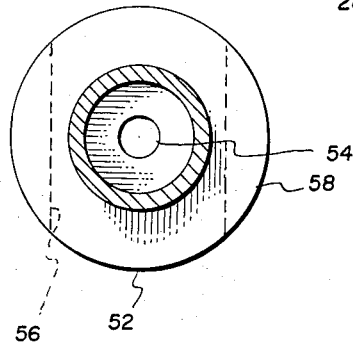
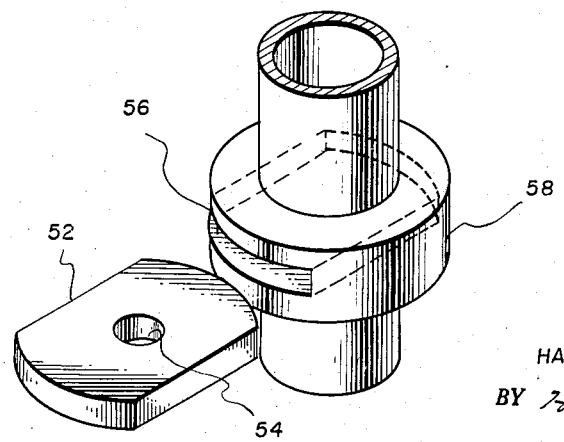
INVENTOR.
HARRY F. RAMSBERGER
BY
ATTORNEY.

United States Patent Office 2,748,890
Patented June 5, 1956

2,748,890

LIQUID CONTROL DEVICE FOR FLUSH TYPE PRECIPITATORS

Harry F. Ramsberger, Plainfield, N. J., assignor to Research Corporation, New York, N. Y., a corporation of New York Application February 17, 1954, Serial No. 410,802

4 Claims. (Cl. 183—7)

This invention relates to liquid flow control devices for electrical precipitators, and in particular to liquid flow control devices for liquid flush type collecting electrodes thereof.

Electrical precipitators of the liquid flush collecting electrode type are generally provided with a plurality of vertically extending collecting pipes or tubes which are assembled within a housing or casing and mounted adjacent their upper ends on a horizontally extending wall or header plate. The gas stream to be cleaned is passed vertically through the collecting electrode pipes, and an opposing precipitating electrode extends centrally within each pipe. Water or other suitable liquid is supplied to the space around the upper ends of the collecting pipes above the header plate, and flows over the upper edges of these electrodes and down the inside surfaces thereof on which the suspended material is precipitated. The space above the header plate generally constitutes a liquid supply chamber or pond, and the upper ends of the collecting electrodes extend upwardly above the header plate and act as overflow lips or weirs to control the flow of water into each electrode.

One of the important features in supplying flushing liquid to collecting pipe electrodes of such precipitators is to supply the liquid at a uniform rate. When the rate of flow is too low, dry spots develop on the surface of the pipes which permits precipitate to collect at such points resulting in arcing. On the other hand, if the rate of flow is too great, the flushing liquid short-circuits the precipitator as it leaves the collecting pipe and is wasteful of the flushing liquid.

In the past it has often been difficult to obtain a uniform rate of flow through the collecting electrodes due, for example, to changes in the pressure of the flushing liquid, and constant regulation of the supply valve has been necessary in order to maintain optimum precipitator efficiency. This has been particularly true on installations where the header plate is divided into a plurality of sections or ponds and each pond is adapted to supply a number of collecting pipe electrodes.

It is therefore the principal object of this invention to provide control means for maintaining a uniform flow of flushing liquid to liquid flushed type collecting electrodes.

A further object is to provide such a system which prevents tampering with the liquid flow rate after it has been initially regulated.

Another object of the invention is to provide such a system whereby the rate of flow of flushing liquid to a plurality of ponds in the same precipitator unit may be independently controlled.

A further object of the invention is to provide a flow control system that is independent of pressure fluctuations within wide limits.

A further object is to provide such a device wherein the collecting pipes may be flushed down and cleaned without interfering with the initial adjustment of the normal rate of flow of flushing liquid.

These and other objects and advantages are provided in a liquid flush type electrical precipitator including a plurality of vertical collecting electrode tubes supported at their upper ends in a header plate, wall members cooperating with the header plate to provide a plurality of ponds and a liquid supply duct for each of the ponds, liquid control means for the liquid supply ducts which generally comprise a liquid supply manifold connected to a source of flushing liquid under pressure, separate conduit means connecting the supply ducts with the manifold, valves in each of the conduit means, by-pass conduits about each of the valves, and plate means having an orifice therethrough across each of the by-pass conduit means to control the flow of flushing liquid around each of the valves.

The invention will be more particularly described in reference to the accompanying drawings in which:

Figure 1 is an elevational view in partial section of a flush type electrical precipitator constructed in accordance with the teaching of this invention;

Figure 2 is a section on line 2—2 of Figure 1;

Figure 3 is an enlarged fragmentary view of the flow control means of the invention;

Figure 4 is a section on line 4—4 of Figure 3; and

Figure 5 is a fragmentary exploded perspective view of an orifice plate and support of the flow control device.

In reference to the drawing and in particular Figures 1 and 2, 10 is the casing or housing of a liquid flush electrical precipitator having a gas inlet 12 positioned in the side thereof and a gas outlet 14 provided in the top of the casing.

Within the casing 10 is a plurality of tubular collecting electrodes 16 which extend through and are supported by a header plate 18, which is horizontally positioned across the casing adjacent its upper end. A wire type discharge electrode 20 is centrally disposed within each of the tubular collecting electrodes 16 and supported from bus bars 22 and insulators 24 as is well known in the art.

As more clearly shown in Figure 2 of the drawings wall members 26 cooperate with the header plate 18 and the casing 10, to provide a plurality of ponds generally designated A, B and C above the collecting electrode pipes. Each pond acts as a reservoir for flushing liquid for the collecting electrodes within its particular section.

Each pond is provided with a network of liquid supply ducts generally designated 28 which are all connected to a common supply conduit for each pond. The supply conduits are designated 32, 34 and 36 for ponds or sections A, B and C, respectively. The lower ends of the conduits 32, 34 and 36 are connected to a manifold 38 having a substantially larger cross-section than the supply conduits.

Supply conduits 32, 34 and 36 are provided with manually controllable shut-off valves 40, 42 and 44 respectively. A by-pass conduit 46 connected at either end to the supply conduit 32 by-passes the manual shut-off valve 40, while by-pass conduits 48 and 50 similarly by-pass valves 42 and 44 of supply conduits 34 and 36.

Within each of the by-pass conduits is a removable plate member 52, having an opening 54 therethrough as more clearly shown in Figures 4 and 5 of the drawings. In the preferred form of construction the plate members 52 are slidably carried in openings 56 in flanges 58 coupled to their respective by-pass conduits. The size of each of the openings 56 is so selected that the plate member 52 will snugly fit therein, eliminating necessity of additional packing means. It will be understood, however, that suitable packing means may be used without departing from the scope of the invention.

One end of the manifold 38 is closed as at 60 while the other end is connected to a source of flushing liquid not shown through pipe 62 and a conventional pressure regulating valve 64. The pressure regulating valve 64 preferably has an external control means generally designated 66 for preselecting its operating range.

A pressure gage 68, to aid in the presetting of the pressure regulating valve 66, and a draincock 70, to enable the convenient draining of the liquid supply system, may be attached to the manifold 38.

In operation of the control system valves 40, 42 and 44 are placed in the closed position. Pressure regulating valve 66 is then set to maintain a preselected pressure in manifold 38, which pressure should be lower than the normal fluctuations in the line pressure, and the rate of flow of flushing liquid for each of the conduits 32, 34 and 36 is calculated. Aperture plates 52 having openings 54 therein of such dimensions that the calculated rate of flow of flushing liquid is provided, are then inserted in their respective flanges 58 in by-pass conduits 46, 48 and 50. The pond units A, B and C are thus provided with a predetermined amount of flushing liquid which flows down the interior surfaces of collecting electrode pipes 16 and into the lower portion of the precipitator casing 10. The flushing liquid containing the precipitated material is drained from the lower portion of the precipitator through syphon type discharge pipes generally designated 72.

When it is desired to flush the ponds valves 40, 42 and 44 are opened permitting a full stream of flushing liquid to flow upwardly through conduits 32, 34 and 36.

As shown in the drawings spray outlets 74 may be positioned in the upper portion of the precipitator shell to aid in the flushing of the ponds. The spray outlets 74 may be conveniently connected to the manifold 38 through conduit 76 having a flow control valve 78 therein.

From the foregoing description it will be seen that the present liquid flow control means for flush type precipitators fully accomplishes the aims, objects and advantages of the invention.

It will be apparent to those skilled in the art that various modifications may be made in the form of the invention, for example, while the invention has been particularly described and shown in reference to liquid flush collecting pipe electrodes, the objects of the invention will be fully accomplished when applied to liquid flushed plate type electrodes.

I claim:

1. In a liquid flush type electrical precipitator including a plurality of vertical collecting electrodes, wall means cooperating with said electrodes to provide a plurality of ponds at their upper ends, and a liquid supply duct for each of said ponds, liquid control means for said liquid supply ducts comprising a liquid supply manifold connected to a source of flushing liquid under pressure, separate conduit means connecting said supply ducts with said manifold, valves in each of said conduit means, by-pass conduits about each of said valves, and non-rotatable plate means having an orifice therethrough across each of said by-pass conduit means to control the flow of flushing liquid around each of said valves, the orifices in each of said plate means being so selected that an optimum amount of flushing liquid is directed to each of said ponds.

2. In a liquid flush type electrical precipitator including a plurality of vertical collecting electrode tubes supported at their upper ends in a header plate, wall members cooperating with said header plate to provide a plurality of ponds, and a liquid supply duct for each of said ponds, liquid control means for said liquid supply ducts comprising a liquid supply manifold connected to a source of flushing liquid under pressure, separate conduit means connecting said supply ducts with said manifold, valves in each of said conduit means, by-pass conduits about each of said valves, and non-rotatable plate means having an orifice therethrough across each of said by-pass conduit means to control the flow of flushing liquid around each of said valves, the orifices in each of said plate means being so selected that an optimum amount of flushing liquid is directed to each of said ponds.

3. In a liquid flush type precipitator as defined in claim 2 including a pressure control valve in said manifold for controlling the pressure of the flushing liquid in said manifold.

4. In a liquid flush type precipitator as defined in claim 2 wherein said plate means are slidably carried by said by-pass conduits.

References Cited in the file of this patent

UNITED STATES PATENTS

| | | |
|---|---|---|
| 597,141 | Craig | Jan. 11, 1898 |
| 1,803,437 | Reney et al. | May 5, 1931 |
| 1,968,334 | Crowder et al. | July 31, 1934 |
| 2,412,912 | Schmidt et al. | Dec. 17, 1946 |
| 2,633,859 | Klosse | Apr. 7, 1953 |
| 2,701,028 | Eilenberger | Feb. 1, 1955 |

FOREIGN PATENTS

| | | |
|---|---|---|
| 338,857 | Great Britain | Nov. 24, 1930 |
| 347,916 | France | Jan. 21, 1919 |
| 614,522 | France | Apr. 14, 1926 |